US010843603B2

(12) United States Patent
Kinard et al.

(10) Patent No.: US 10,843,603 B2
(45) Date of Patent: Nov. 24, 2020

(54) COMPOSITE SEATING COMPONENTS

(71) Applicant: Safran Seats USA LLC, Gainesville, TX (US)

(72) Inventors: Marc W. Kinard, Corinth, TX (US); Joshua T. Smith, Denton, TX (US)

(73) Assignee: Safran Seats USA LLC, Gainvesville, TX (US)

( * ) Notice: Subject to any disclaimer, the term of this patent is extended or adjusted under 35 U.S.C. 154(b) by 0 days.

(21) Appl. No.: 16/315,649

(22) PCT Filed: Jul. 7, 2016

(86) PCT No.: PCT/US2016/041363
§ 371 (c)(1),
(2) Date: Jan. 6, 2019

(87) PCT Pub. No.: WO2018/009201
PCT Pub. Date: Jan. 11, 2018

(65) Prior Publication Data
US 2019/0299827 A1 Oct. 3, 2019

(51) Int. Cl.
*B60N 2/68* (2006.01)
*B60N 2/70* (2006.01)
*B64D 11/06* (2006.01)
*B60N 2/42* (2006.01)
(Continued)

(52) U.S. Cl.
CPC ............. *B60N 2/70* (2013.01); *B60N 2/4249* (2013.01); *B60N 2/7017* (2013.01); *B64D 11/0015* (2013.01); *B64D 11/0619* (2014.12); *B64D 11/0647* (2014.12); *B60N 2/60* (2013.01); *B60N 2/6009* (2013.01); *B60N 2/68* (2013.01);
(Continued)

(58) Field of Classification Search
CPC ........ B60N 2/686; B60N 2/60; B60N 2/6009; B60N 2/4249; B60N 2/68; B64D 11/0619; B64D 11/06; B64D 11/0646
See application file for complete search history.

(56) References Cited

U.S. PATENT DOCUMENTS 3,323,835 A * 6/1967 Barecki ................... B60N 3/06
297/451.1
3,695,707 A * 10/1972 Barecki ................... B60N 2/22
297/452.55
(Continued)

FOREIGN PATENT DOCUMENTS

JP         6357173 B2 * 7/2018  ............. B60N 2/682
WO    2013109751 A1    7/2013

OTHER PUBLICATIONS

International Patent Application No. PCT/US2016/041363, International Search Report and Written Opinion, dated Jun. 19, 2017.

*Primary Examiner* — Syed A Islam
(74) *Attorney, Agent, or Firm* — Kilpatrick Townsend & Stockton LLP

(57) ABSTRACT

Composite components (22, 32) are described herein. An example composite component (22, 32) includes a fill material sandwiched between a first shell and a second shell. The first shell can include a cavity for receiving the fill material. The second shell can include a recessed portion extending into the cavity. The recessed portion can be configured to receive a separate component (16a, 30) of a passenger seat (12).

23 Claims, 6 Drawing Sheets

(51) Int. Cl.
*B64D 11/00* (2006.01)
*B60N 2/60* (2006.01)

(52) U.S. Cl.
CPC .............. *B60N 2/686* (2013.01); *B64D 11/06* (2013.01); *B64D 11/0646* (2014.12); *Y02T 50/46* (2013.01)

(56) References Cited

U.S. PATENT DOCUMENTS

| | | | | |
|---|---|---|---|---|
| 3,744,843 A * | 7/1973 | Barecki | .................. | B60N 2/242 |
| | | | | 297/316 |
| 4,099,780 A * | 7/1978 | Schmidhuber | ......... | B64D 11/06 |
| | | | | 297/232 |
| 4,647,980 A * | 3/1987 | Steventon | .......... | B64D 11/0015 |
| | | | | 348/837 |
| 7,237,846 B1 * | 7/2007 | Arima | .................. | B60N 2/6009 |
| | | | | 297/452.18 |
| 7,354,019 B2 * | 4/2008 | Bauer | ...................... | B60N 2/68 |
| | | | | 244/118.6 |
| 7,997,656 B2 * | 8/2011 | Inagaki | .................... | B60N 2/58 |
| | | | | 297/452.38 |
| 8,528,981 B2 * | 9/2013 | Funk | ....................... | B29C 44/18 |
| | | | | 297/216.1 |
| 8,573,690 B2 * | 11/2013 | Shoji | .................. | B64D 11/0619 |
| | | | | 297/216.1 |
| 8,662,589 B2 * | 3/2014 | Suzuki | ..................... | B60N 2/22 |
| | | | | 297/378.12 |
| 8,678,506 B2 * | 3/2014 | Beneker | ................... | B60N 2/68 |
| | | | | 297/452.18 |
| 8,777,310 B2 * | 7/2014 | Westerink | .............. | B64D 11/06 |
| | | | | 297/217.3 |
| 8,894,154 B2 * | 11/2014 | Kulkarni | ................ | B60N 2/682 |
| | | | | 297/452.1 |
| 9,016,627 B2 * | 4/2015 | Margis | .................... | B60N 3/004 |
| | | | | 244/118.6 |
| 9,114,741 B2 * | 8/2015 | Nagata | .................... | B60N 2/682 |
| 9,365,138 B2 * | 6/2016 | Mueller | ................... | B60N 2/68 |
| 9,788,021 B2 * | 10/2017 | Margis | ................ | H04N 21/2146 |
| 9,969,309 B2 * | 5/2018 | Nakagawa | ........... | B60N 2/6009 |
| 9,987,960 B2 * | 6/2018 | Taguchi | ................ | B60N 2/5825 |
| 10,227,023 B2 * | 3/2019 | Lasell | ................ | B60N 2/42709 |
| 10,442,330 B2 * | 10/2019 | Le | .......................... | B60N 3/004 |
| 2005/0132407 A1 * | 6/2005 | Boyer, Jr. | .......... | H04N 7/17318 |
| | | | | 725/77 |
| 2011/0169317 A1 * | 7/2011 | Fujita | ....................... | A47C 7/02 |
| | | | | 297/452.2 |
| 2015/0306983 A1 * | 10/2015 | Takei | ..................... | B60N 2/165 |
| | | | | 297/183.9 |
| 2015/0343929 A1 * | 12/2015 | Yasuda | ................. | B29C 44/1228 |
| | | | | 297/452.18 |
| 2016/0325659 A1 * | 11/2016 | Taguchi | ................ | B60N 2/5825 |
| 2019/0070989 A1 * | 3/2019 | Klap | ...................... | B60N 2/686 |
| 2019/0226813 A1 * | 7/2019 | Susko | .................. | F41H 5/0421 |

\* cited by examiner

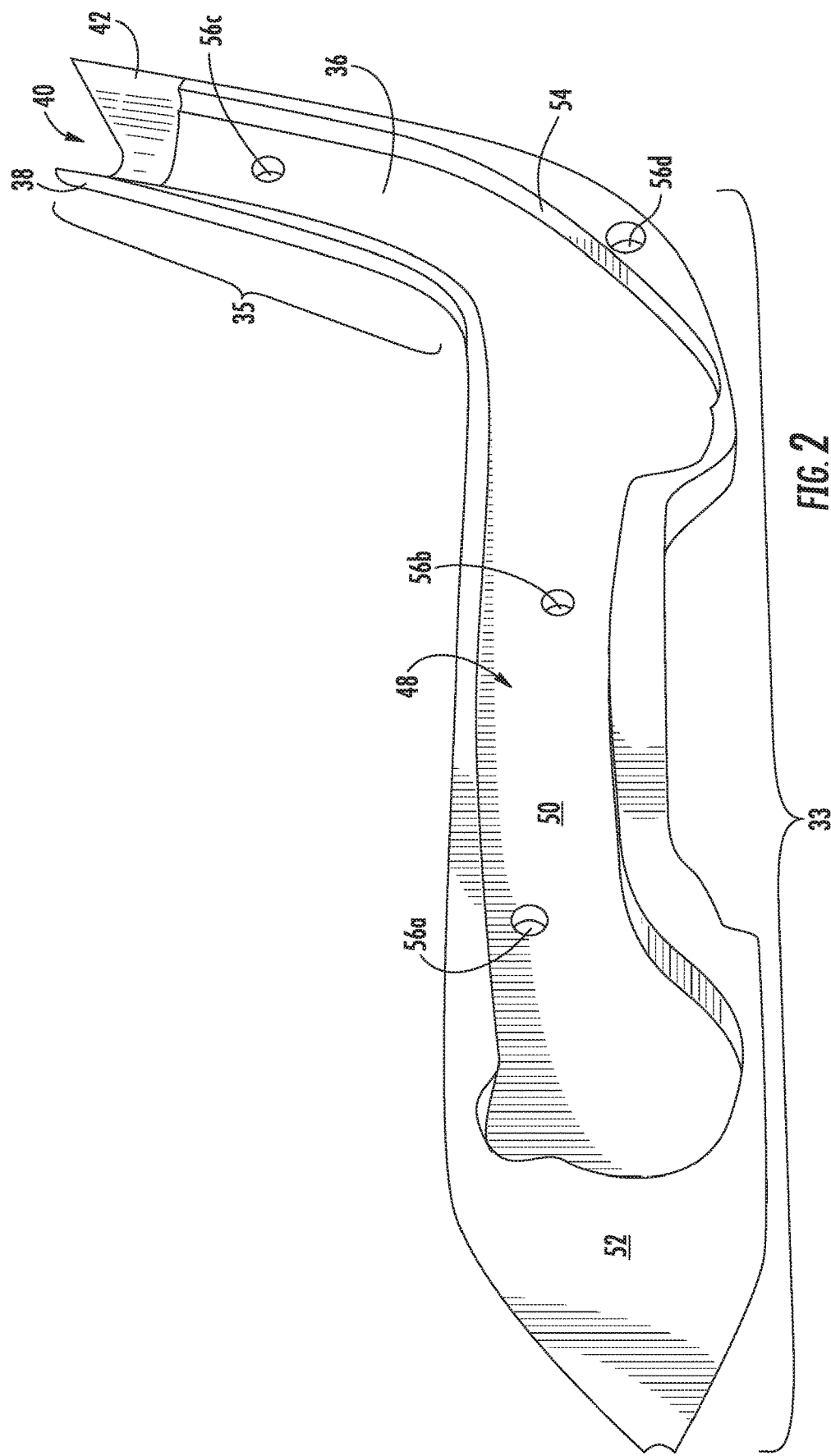

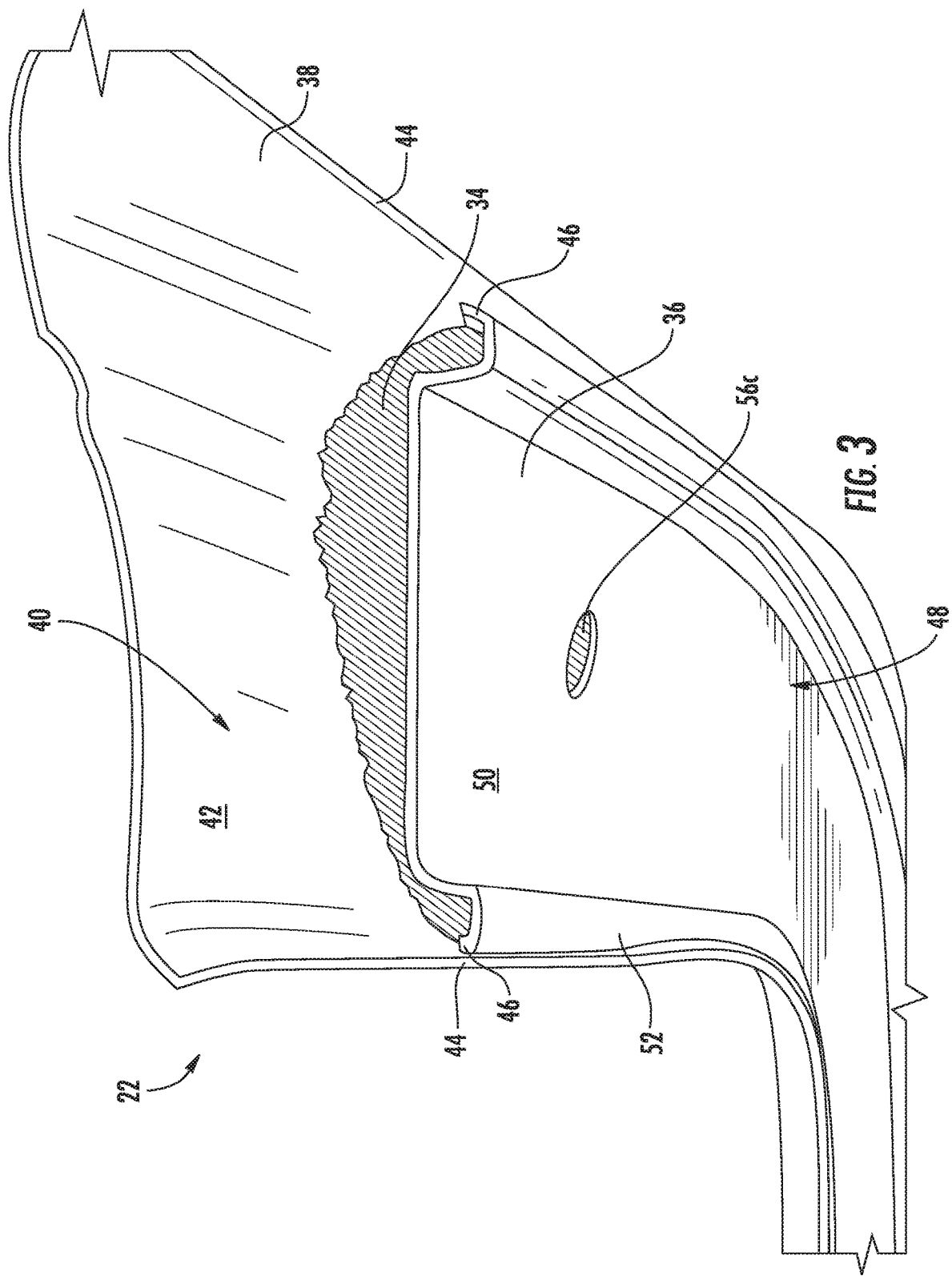

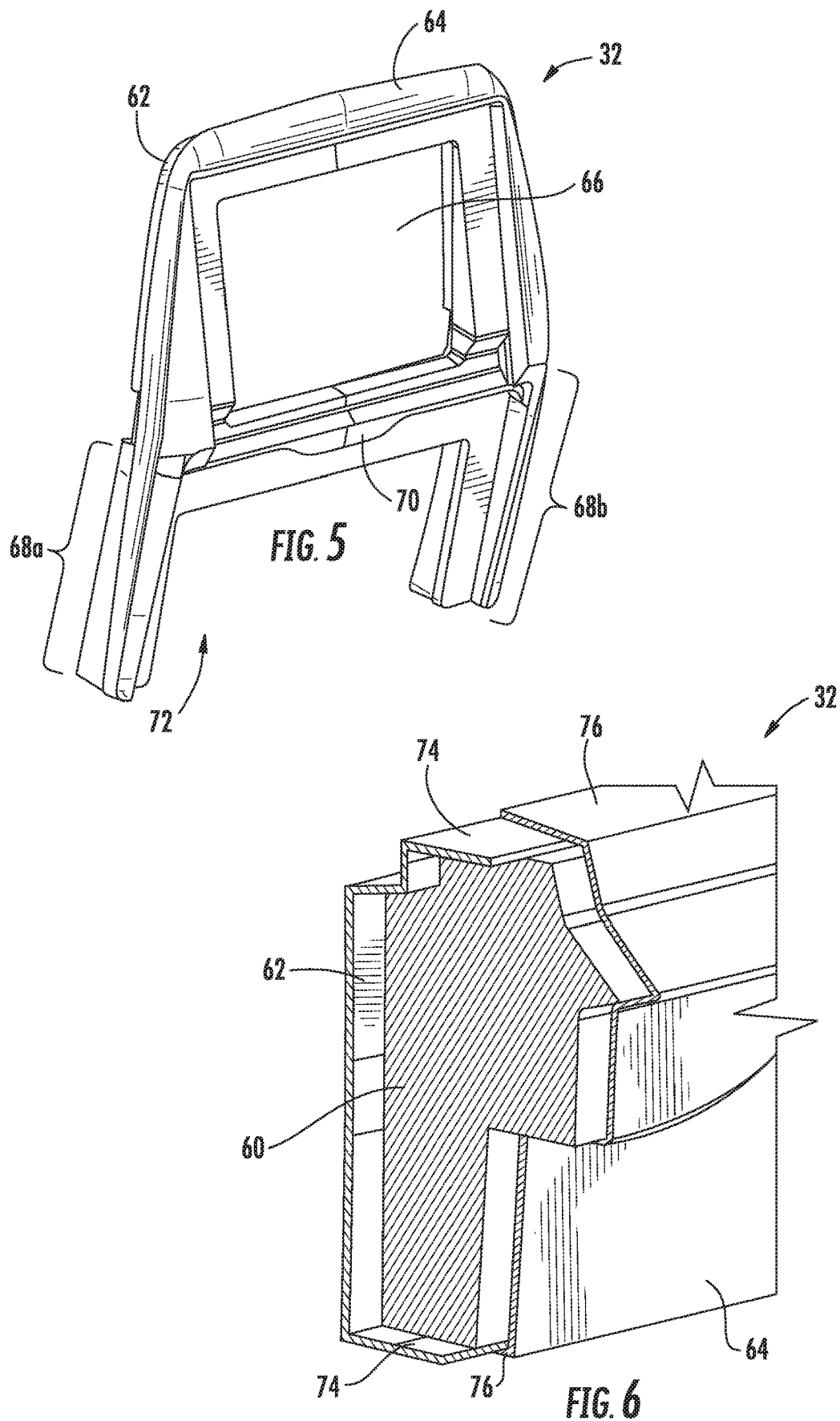

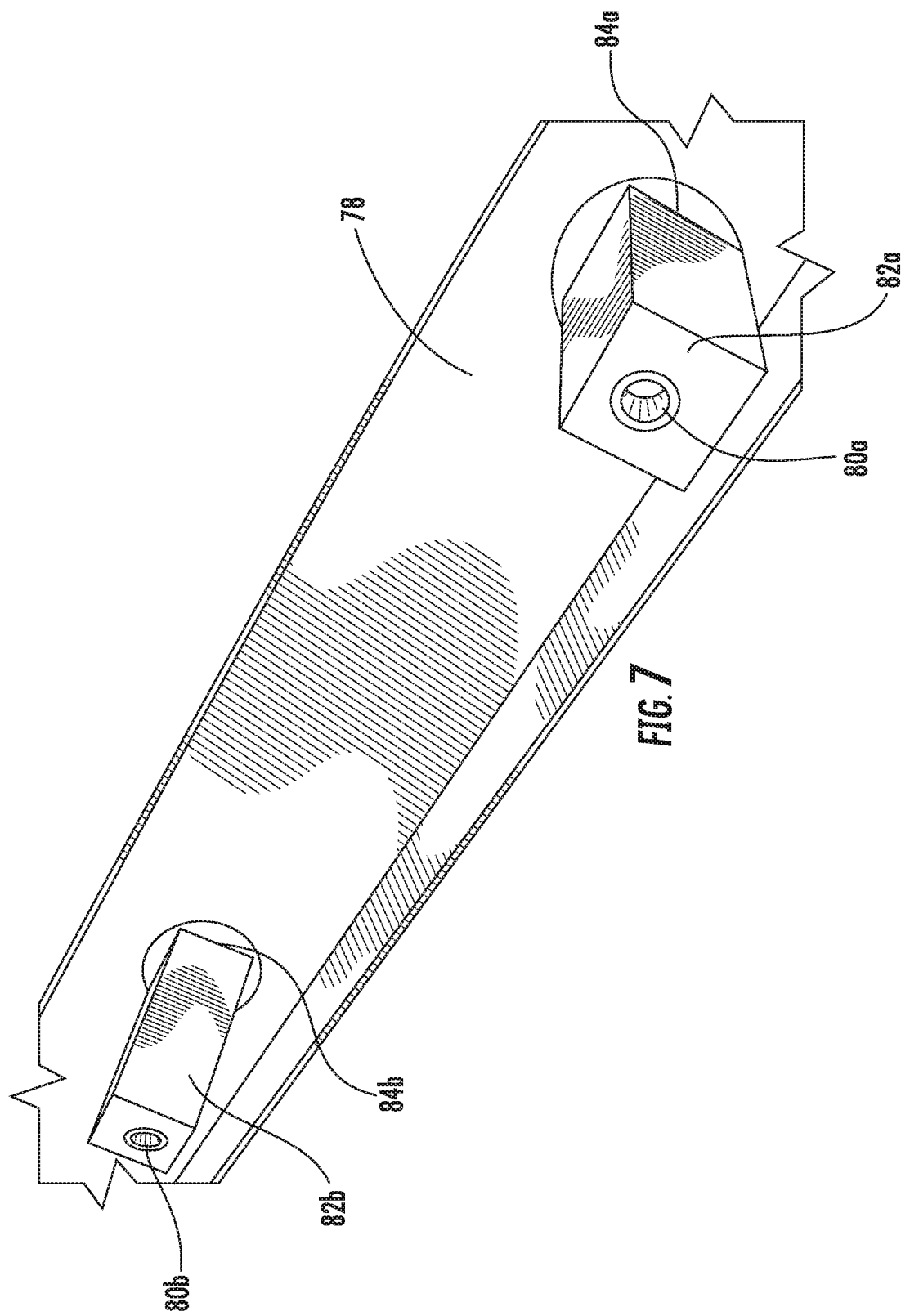

COMPOSITE SEATING COMPONENTS

FIELD OF THE DISCLOSURE

The field of the disclosure relates to seating components in transportation vessels.

BACKGROUND

In various transportation vessels, passenger seats are arranged in a series of rows with one or more aisles intersecting the rows. In addition to passenger traffic moving through the aisles, items may be rolled or otherwise directed down the aisles. For example, suitcases and service carts may be rolled through the aisles. At times these items may collide with the passenger seats. To minimize damage potentially caused by these collisions, bumpers are typically installed along outside surfaces of the passenger seats. Typically, such bumpers may be injection-molded pieces, which may be structurally brittle. Because of this, the bumpers may require frequent replacement. In addition, the added weight attributable to the bumpers can be considerable, especially in vessels that include many passenger seats.

In the row and aisle seating arrangement, rows of passenger seats are arranged behind other rows. The passenger seats may be designed with a variety of comforts for passengers seated thereon, including communication and entertainment features, such as video monitors, telephones, shrouds, or other items. During a minor crash landing, a passenger may be thrown forward so that the passenger's head and/or body strikes these structures due to inertial loads from the event. The addition of shrouds and other structures in passenger seatbacks may pose a challenge to occupant safety. For example, passenger safety is typically measured in terms of Head Injury Criterion ("HIC") and delethalization.

HIC is a measure of the likelihood of head injury resulting from an impact event. The HIC is used to assess safety related to occupants. Normally, this variable is derived from the acceleration/time history of an accelerometer mounted at the center of gravity of a dummy's head when the dummy is exposed to crash forces. As a result, HIC includes the effects of head acceleration and the duration of the acceleration (i.e., large accelerations may be tolerated if the duration is very short). Delethalization includes requirements that limit the exposure of sharp edges to occupants. During a crash event, sharp edges may occur as a result of head impact.

As a result, it may be desirable to integrate structures into passenger seatbacks that have energy dissipation features included therein, which will allow for energy dissipation within allowable HIC values and prevents rupture of structures beyond the bounds of delathalization standards.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain examples, a seat assembly including a base frame, seat spreader bracket, and bumper device is provided. The seat spreader bracket can be coupled to the base frame and support at least a seatback. The bumper device can be coupled to the seat spreader bracket and enclose at least a portion of the seat spread bracket. The bumper device can include an outer shell and an inner shell, with a foam fill material disposed between the outer shell and the inner shell.

In some examples, the outer shell is a first outer shell, the inner shell is a first inner shell, and the fill material is a first fill material. The seat assembly can further include a shroud coupled to the seatback and covering at least a portion of the seatback. The shroud can include a second outer shell and a second inner shell, with a second foam fill material disposed between the second outer shell and the second inner shell.

In some examples, the outer shell can include a cavity bounded along an inner surface of the outer shell and an inner shell. The inner shell can include a recessed portion extending into the cavity toward the outer shell. The recessed portion can be configured to receive the seat spreader bracket and enclose at least the portion of the seat spreader bracket when the bumper is installed on the seat spreader bracket.

In some examples, each of the outer shell, the inner shell, the outer shell, and the inner shell can be formed using a thermoforming technique.

According to certain examples, a device for use with a seat assembly is provided. The device can include an outer shell, an inner shell, and a fill material. The outer shell can include a cavity bounded along an inner surface of the outer shell. The inner shell can include a recessed portion extending into the cavity toward the outer shell. The recessed portion can be configured to receive a component of the seat assembly. The fill material can be disposed within at least a portion of the cavity and extend between the outer shell and the inner shell.

In some examples, the outer shell can be formed from a thermoplastic polymer having a thickness of between 0.03 inches and 0.1 inches.

In some examples, the device can include one or more bosses attached to the outer shell. The one or more bosses can be used to releasably couple the device to the component of the seat assembly.

In some examples, the fill material can include at least one of an expanded polystyrene foam or a polyvinylidene fluoride foam.

In some examples, the fill material has a density of between 15 kilograms per cubic meter and 40 kilograms per cubic meter.

In some examples, the component can include a seat spreader bracket, an armrest, or a seatback.

In some examples, the outer shell can include a first perimeter edge, with the cavity bounded by the first perimeter edge. The inner shell can include a second perimeter edge, the first perimeter edge and the second perimeter edge forming a connection between the outer shell and the inner shell.

In some examples, the connection can include at least one of a nested connection, an adhesive connection, a bonded connection, or combinations thereof.

According to certain examples, a shroud for use with a seat assembly is provided. The shroud can include an outer shell, an inner shell, and a fill material. The outer shell can include a first cavity and a first lip. The first cavity can be bounded along a first inner surface of the outer shell. The first lip can extend about a first portion of a first perimeter of the outer shell. The inner shell can include a second cavity and a second lip. The second cavity can be bounded along a second inner surface of the inner shell. The second lip can extend about a second portion of a second perimeter of the inner shell. At least one of the first lip or the second lip can be configured to at least partially overlap the other. The fill material can be disposed within the second cavity and extend between the outer shell and the inner shell.

In some examples, the shroud can also include an opening configured to receive a personal entertainment device.

In some examples, the shroud can also include a first leg, a second leg, and a space disposed between the first leg and the second leg, The space can be configured to receive a tray table coupled to the seat assembly.

In some examples, the first lip and the second lip form a connection between the outer shell and the inner shell.

In some examples, the outer shell is formed from a thermoplastic polymer comprising a thickness of between 0.03 inches and 0.1 inches.

In some examples, the shroud further includes one or more bosses attached to the outer shell. The one or more bosses can be used to releasably couple the shroud to the seat assembly.

In some examples, the fill material can include at least one of an expanded polystyrene foam or a polyvinylidene fluoride foam.

In some examples, the fill material can have a density of between 15 kilograms per cubic meter and 40 kilograms per cubic meter.

According to certain examples, a method is provided. The method can include providing a composite component and installing the composite component. The composite component can include an outer shell and an inner shell, with a foam fill material disposed between the outer shell and the inner shell. The composite component can be configured to couple to a part of a seat assembly. Installing the composite component can include installing the composite component on the seat assembly such that the composite component detachably couples with the part of the seat assembly.

BRIEF DESCRIPTION OF THE DRAWINGS

FIG. 2 shows a perspective view of an example composite bumper device.

FIG. 3 shows a top perspective view of the composite bumper device of FIG. 2.

FIG. 5 shows a back perspective view of an example composite shroud.

FIG. 6 shows a profile view of the composite shroud of FIG. 5.

FIG. 7 shows an example boss for use in connection with the composite components.

DETAILED DESCRIPTION

The subject matter of embodiments of the present disclosure is described here with specificity to meet statutory requirements, but this disclosure is not necessarily intended to limit the scope of the claims. The claimed subject matter may be embodied in other ways, may include different elements or steps, and may be used in conjunction with other existing or future technologies. This disclosure should not be interpreted as implying any particular order or arrangement among or between various steps or elements except when the order of individual steps or arrangement of elements is explicitly described.

The described embodiments of the disclosure provide composite seating components. While the composite seating components are discussed for use with aircraft seats, they are by no means so limited. Rather, embodiments of the composite seating components may be used in passenger seats or other seats of any type or otherwise as desired.

Embodiments described herein include forming components of passenger seat assemblies (e.g., seat bracket bumpers, seatback shrouds, etc.) as a combination of a structural foam fill material sandwiched between one or more sheets of thermoplastic material (e.g., polycarbonate). Forming the components in this manner has improved characteristics when compared to conventional injection molded parts. For example, composite components can have multiple tunable parameters (e.g., thickness and type of thermoplastic sheet(s), density of foam fill material, thickness of foam fill material, etc.). These parameters can be adjusted to optimize weight, durability, energy absorption, delethalization (e.g., likelihood of splintering, delaminating, etc.), and the like.

Although the embodiments are described with respect to a bumper device and a shroud device, it should be understood that they may also be used with armrests, on moving or other stationary objects within a transportation vessel (e.g., service carts, edges of door frames, edges of divider walls, edges of seat shells, etc.), and any other object requiring cushioning. The bumper device and the shroud device described herein are examples of composite seating components. Each may be formed from similar materials and in a similar manner. Thus, description of embodiments of the bumper device is equally applicable the shroud and description of the shroud device is equally applicable to the bumper device.

The composite components described herein may be installed on existing seat assemblies or included in new seat assemblies. Similarly, the composite components may be formed in a manner that enables removal and replacement. For example, once a bumper device is worn out, it may be replaced without having to replace the entire seat assembly.

Figure 1:
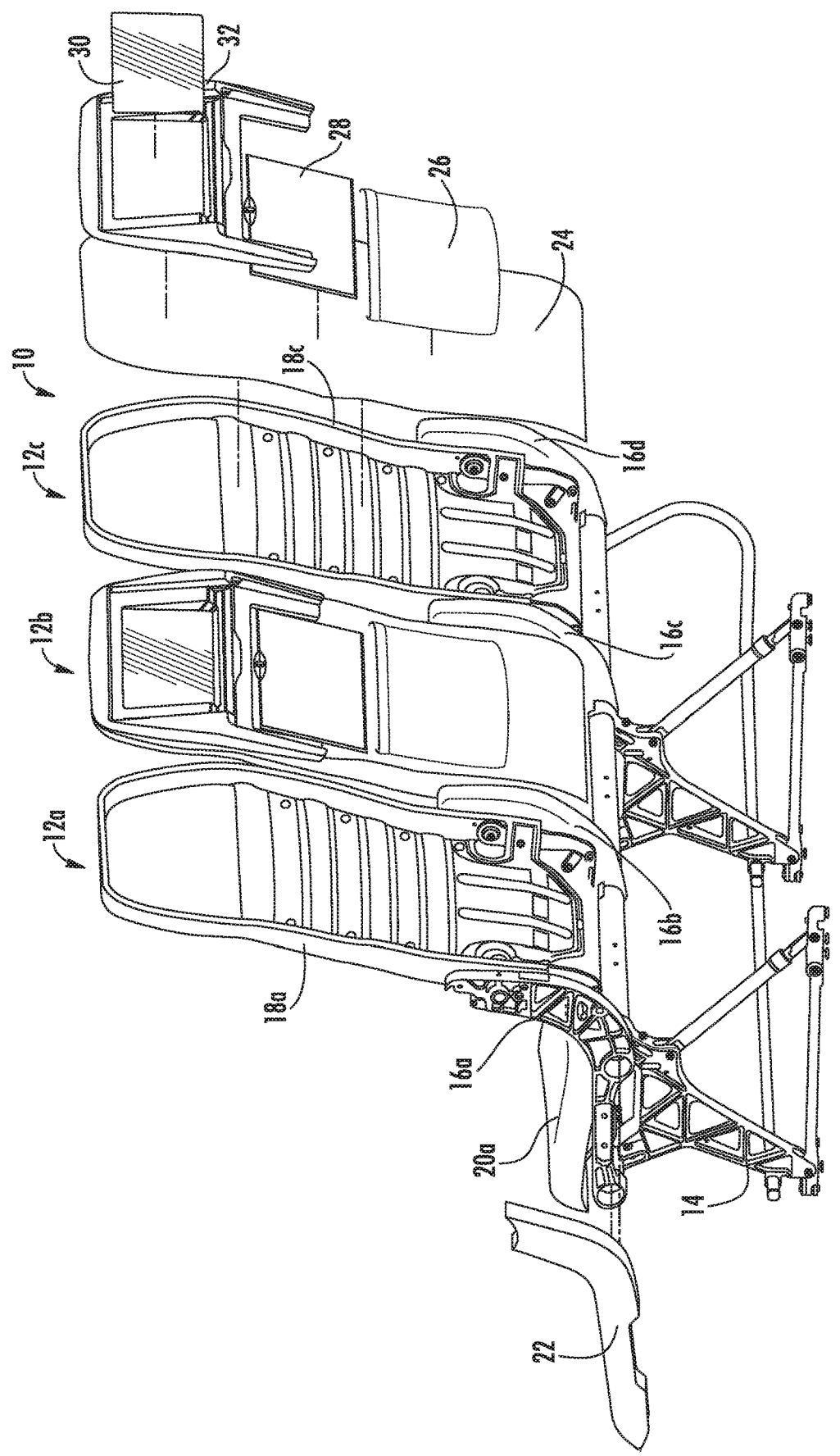
FIG. 1 shows a perspective view of a seat row assembly including example composite components.

Turning now to the figures, FIG. 1 illustrates a seat row assembly 10 that includes a set of seat assemblies 12a, 12b. and 12c. Each seat assembly 12 can include one or more composite components as described herein. Each seat assembly 12 includes a base frame 14. One or more seat spreader brackets 16 are coupled to the base frame 14. Seatbacks 18 are attached to the base frame 14 via the seat spreader brackets 16. The seat spreader brackets 16 may also support other components of the seat assemblies 12. For example, arm rests and seat belts may be attached to the seat spreader brackets 16. Seat pans 20 may also be attached to the seat spreader brackets 16.

The seat row assembly 10 may be installed in vessels such that the seat assemblies 12a and 12c are adjacent to aisles of the vessel. In some examples, only one of the seat assemblies 12a, 12c is adjacent to the aisle, while the other seat assembly is disposed adjacent to a wall of the vessel. For example, in a narrow-body aircraft including a single center aisle, either the seat assembly 12a or the seat assembly 12c will be disposed adjacent the aisle. As described herein, passengers carry or roll their luggage down the aisle. Similarly, service carts are pushed through the aisles. Inadvertently the luggage and service carts can collide with the exposed seat spreader brackets 16a (or 16c). In order to protect the exposed seat spreader brackets 16, bumper devices 22 are provided. The bumper device 22 is an example of a composite component as described herein.

As shown by FIG. 1, the bumper device 22 can be coupled to the seat spreader bracket 16a as described herein. The bumper device 22 may be formed in a manner capable of sustaining collisions, impacts, and other loads cause by luggage, service carts, and other objects moving throughout the vessel. The bumper device 22 may also be formed in a manner that reduces weight as compared to conventional bumper devices.

For illustrative purposes, the seatbacks 18a and 18c are illustrated in a state prior to final assembly. In FIG. 1, the seatback 18c is illustrated as an exploded view of a final assembled state. Thus, the seatback 18c includes common components of a passenger seat. These include a padded cover 24, which includes a pocket 26. The seatback 18c also includes a tray table 28 and a personal entertainment device 30. A shroud 32 is adapted to surround at least the tray table 28 and the personal entertainment device 30. The shroud 32 is an example of a composite components as described herein. Thus, it may be formed in a manner capable of absorbing head impact energy associated with a collision event. The shroud 32 may also be formed in a manner that prevents rupture in a manner that exceeds delethalization standards. The shroud 32 may also be formed in a manner that reduces weight as compared to conventional shrouds.

The shroud 32 is coupled to the seatback 18c in any suitable manner. For example, the shroud 32 may include structures to create a snap-fit with the seatback 18c. The shroud 32 may be screwed or riveted to the seatback 18c. For example, the shroud 32 may include one or more interior bosses, which may be threaded. Bolts may be driven from the front side of the seatback 18 and into the bosses of the shroud 32.

FIGS. 2 and 3 illustrate the bumper device 22 introduced with reference to FIG. 1. In particular, FIGS. 2 and 3 illustrate the bumper device 22 from a view of an interior side of the bumper device 22. The illustrated side of the bumper device 22 is the side that will face the seat spreader bracket 16. In the illustrated example, the interior side is adapted to correspond in size and shape to the seat spreader bracket 16. For example, the bumper device 22 may be generally L shaped, with a first leg 33 extending in a first direction and as second leg 35 extending in a second direction. The L shape may correspond to the L shape of the seat spreader bracket 16.

As shown in FIG. 3, the bumper device 22 includes a fill material 34 sandwiched between an inner shell 36 and an outer shell 38. The fill material 34 can be any energy-absorbing structural fill material. Exemplary materials include but are not limited to a foam material (e.g., expanded polystyrene foam, polyvinylidene fluoride foam, or other comparable structural foams). Other examples include crushed core materials and ribbed plastic materials. The fill material 34 can have any suitable density, depending on the implementation. For example, the fill material 34 can have a density ranging between 15 kilograms per cubic meter and 40 kilograms per cubic meter. Depending on the implementation, the fill material 34 may be considered rigid, semi-rigid, flexible, or semi-flexible. For example, using a rigid fill material 34 in connection with the outer shell 38 may result in a bumper device 22 having a solid and/or high quality feel to a user. Alternatively, using a more flexible fill material 34 in connection with the outer shell 38 may help improve energy dissipation characteristics of the bumper device 22. Other combinations of fill materials and shells may be used to achieve other characteristics. The fill material 34 may be bonded to one or more of the shells 36, 38.

The fill material 34 can be installed in place by flowing the fill material 34 into the two shells 36, 38. The fill material 34 may also be blown into the two shells 36, 38 using compressed air. The fill material 34 may also be molded and installed between the two shells 36, 38. Additionally, the fill material 34 may be machined (e.g., from a block of foam) or manufactured in any other suitable manner and installed between the two shells 36, 38. Although illustrated as visible between the shells 36, 38, in some examples, the shells 36, 38 fully enclose the fill material 34. This may be desirable to achieve certain regulatory requirements dealing with flammability. Generally, the type of fill material 34 may be selected to comply with aviation requirements regulating toxicity, smoke, and heat.

The shells 36, 38 can be formed using any suitable technique including, for example, thermoforming, pressure forming, combinations of pressure and thermoforming, and/or any other suitable forming technique, which use molds, forms, patterns, or other such objects corresponding in shape and size to the shells 36, 38. Such forming techniques can include thin-gauge forming and thick-gauge forming. The shells 36, 38 can be formed from any suitable material capable of being forming using the forming techniques described herein. For example, the shells 36, 38 can be formed from any suitable thermoplastic polymer (e.g., polycarbonate such as those sold under the trademarks Lexan and Makrolon, acrylic polyvinyl chloride such as is sold under the trademark Kydex, acrylonitrile butadiene styrene (ABS), polypropylene, polyvinyl chloride, and any other suitable thermoplastic material). The shells 36, 38 can have any suitable thickness, which can include those ranging between 0.03 inches and 0.1 inches. In some examples, the thickness of the shells 36, 38 is limited only by the ability of the bumper device 22 to function as an energy absorbing device. For example, the thickness of the shells 36, 38 may exceed 0.1 inches so long as the bumper device 22 remains capable of absorbing impact energy. The shells 36, 38 may have different thicknesses depending on the implementation. For example, the outer shell 38 may have a first thickness of 0.047 inches, and the inner shell 36 may have a second thickness greater than or less than 0.047 inches. In a particular example, the thickness of both shells 36, 38 is around 0.047 inches. The material for the shells 36, 38 may be selected to comply with aviation requirements regulating toxicity, smoke, and heat.

The outer shell 38 can be formed to have any suitable shape, which may be concave, rounded, or otherwise form a cavity 40. The cavity 40 may be bounded along an inner surface 42 of the outer shell 38. The cavity 40 is used to retain the fill material 34, which may be in contact with the inner surface 42. Because the outer shell 38 is outward facing, it may be considered a cosmetic shell. In this manner, the material of the outer shell 38 may be selected or processed to have a smooth exterior surface (e.g., the surface on the side opposite the inner surface 42). In some examples, the exterior surface may have characteristics of tactility. This can include, for example, raised bumps, application of a sticky substance, and the like.

The outer shell 38 also includes an outer shell perimeter edge 44. The cavity 40 may be bounded by the outer shell perimeter edge 44. The outer shell perimeter edge 44 extends around the perimeter of the outer shell 38. The outer shell perimeter edge 44 can be used to couple the outer shell 38 with the inner shell 36. For example, as described herein, the inner shell 36 includes an inner shell perimeter edge 46. At least a portion of the outer shell perimeter edge 44 may be brought into physical contact with at least a portion of the inner shell perimeter edge 46. At these points of contact, the two edges 44, 46 form a connection that connects the two shells 36, 38. The two edges 44, 46 can close together with the fill material 34 disposed within the void formed between the two shells 36, 38. In some examples, the fill material 34 fills up the entirety of the void and extends from an inner surface of the inner shell 36 to an inner surface of the outer shell 38. In some examples, the fill material 34 is fully enclosed within the void. The connection can be a bonded connection, an adhesive connection, a nested connection, any combination of the foregoing, and/or any other suitable connection. For example, the two edges 44, 46 can each include corresponding interlocking ridges to form a nested connection or a snap-fit connection. In some examples, the two edges 44, 46 do not contact each other. In this example, the bumper device 22 can be held together by bonding each of the shells 36, 38 to the fill material 34.

Figure 4A:
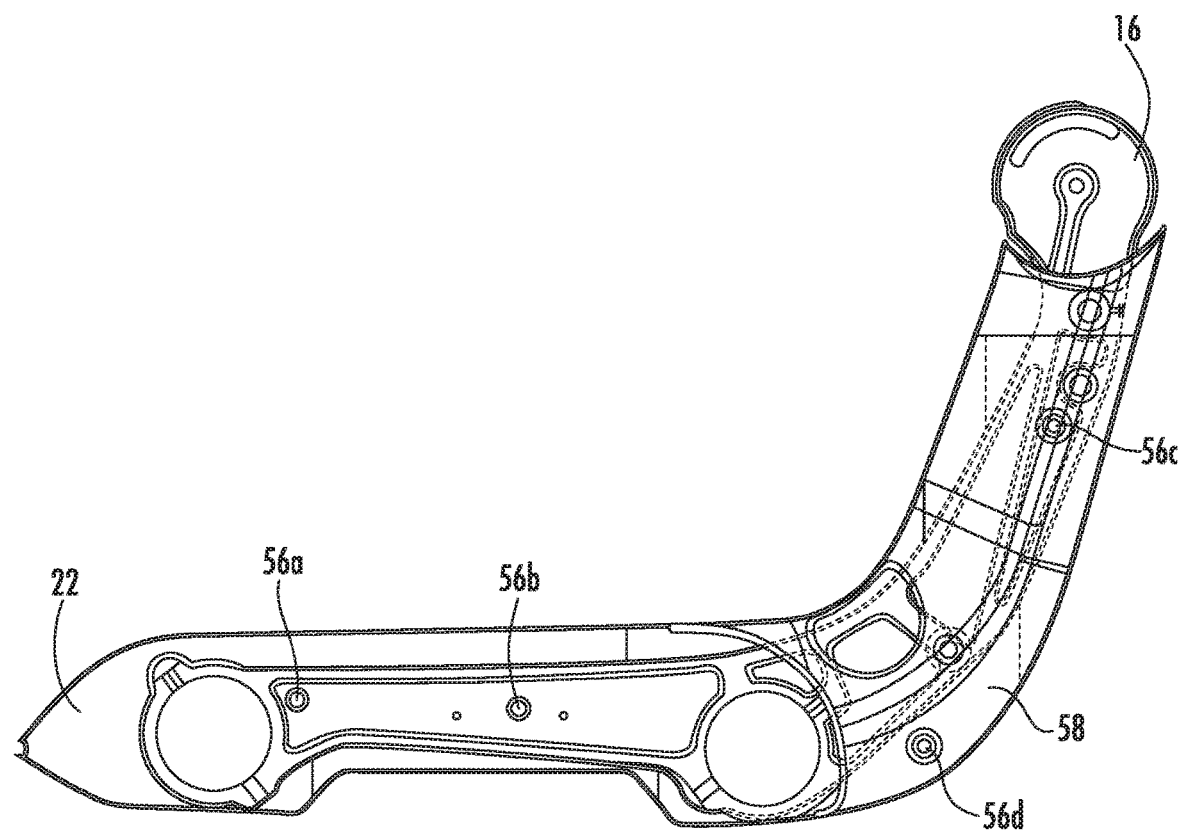
FIG. 4A shows a side view of an example composite bumper device attached to a seat spreader bracket.
Figure 4B:
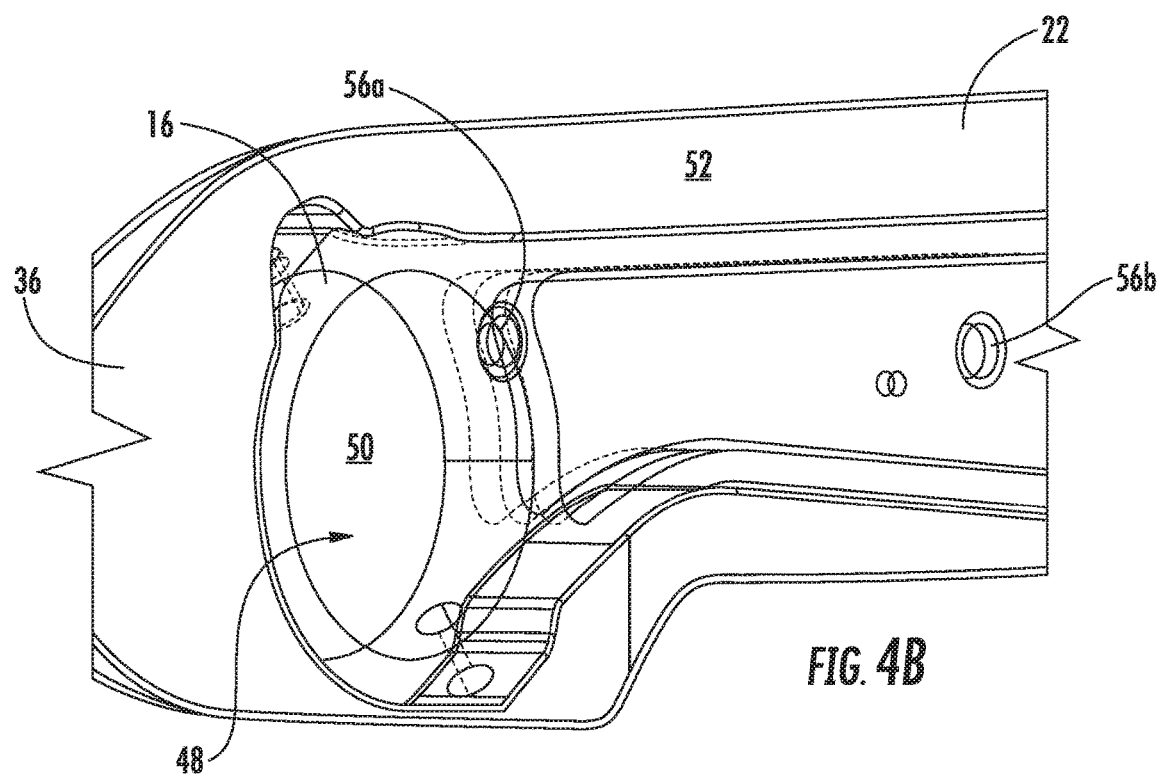
FIG. 4B shows a perspective view of a portion of the composite bumper device and the seat spreader bracket of FIG. 4A.

Like the outer shell 38, the inner shell 36 can be formed to have any suitable shape. In particular, the inner shell 36 is formed to include a recessed portion 48. The recessed portion 48 corresponds in shape and size to the seat spreader bracket 16. In this manner, the outer shell 38 is configured to receive the seat spreader bracket 16. The recessed portion 48 can be formed using a mold or otherwise such that its shape and size is slightly larger than an exterior perimeter of the seat spreader bracket 16. In some examples, the inner shell 36 is formed from a flexible material such that the recessed portion 48 is not formed until the bumper device 22 is installed against the seat spreader bracket 16. In other words, the inner shell 36 and the fill material 34 may be configured to indent and/or give away as the bumper device 22 is brought into contact with the seat spreader bracket 16. For example, as illustrated in FIGS. 4A and 4B, the recessed portion 48 is sized to receive the seat spreader bracket 16. This may enable the bumper device 22 may be mounted about flush against the seat spreader bracket 16. In this manner, the bumper device 22 protects the seat spreader bracket 16 from damage and also covers the seat spreader bracket 16 in an aesthetic manner.

In some examples, the bumper device 22 can be adapted for use at other locations on the seat assembly 12. For example, the bumper device 22 can be adapted for use padding on an armrest. In this example, the recessed portion 48 may correspond in size and shape to a structural component of the armrest.

Referring now to FIG. 2, the recessed portion 48 includes a recessed surface 50, which is recessed away from a surface 52 of the outer shell 38. The recessed surface 50 extends into the cavity 40 towards the inner surface 42 of the outer shell 38. The recessed surface 50 and the surface 52 are connected via a wall surface 54. The fill material 34 may contact the opposite sides of the recessed surface 50, the surface 52, and the wall surface 54. In this manner, the fill material 34 may expand to contact the entirety of the cavity 40. In some examples, at least a portion of the cavity 40 is devoid of fill material 34. For example, such voids may be designed to accommodate structures extending through the bumper device 22 and/or engineered to dissipate energy.

As introduced herein, the inner shell 36 also includes the inner shell perimeter edge 46. The inner shell perimeter edge 46 extends around the perimeter of the inner shell 36. The inner shell perimeter edge 46 can be used to couple the outer shell 38 with the inner shell 36 as described herein.

The bumper device 22 also includes one or more boss openings 56. Bosses may be attached to the inner surface 42 of the outer shell 38. The bosses may be accessible via the boss openings 56 which extend through the fill material 34 and the inner shell 36. For example, to install the bumper device 22 on the seat spreader bracket 16, bolts may be installed through the seat spreader bracket 16 and into the bosses via the boss openings 56. FIG. 7 illustrates example bosses that may be attached to the shells 36, 38.

As illustrated in FIG. 4A, the bumper device 22 also includes a cover shell 58. he cover shell 58 can be attached to the bumper device 22 in order to cover at least a portion of the seat spreader bracket 16. The cover shell 58 may cover the portion of the seat spreader bracket 16 that would otherwise be open to users. As also illustrated in FIGS. 4A and 4B, the bumper device 22 can be coupled to the seat spreader bracket 16 using the bosses accessible via the boss openings 56. The cover shell 58 can be formed of the same or different materials than the shells 36, 38 and formed in the same or a different manner than the shells 36, 38.

FIGS. 5 and 6 illustrate the shroud 32 introduced with reference to FIG. 1. The shroud 32, like the bumper device 22, can be composite. In particular, the shroud 32 includes a fill material 60 disposed between an inner shell 62 and an outer shell 64. The fill material 60 is an example of the fill material 60. Likewise the shells 63, 64 are examples of the shells 36, 38. Thus, the fill material 60 can be any suitable fill material including those discussed with reference to the fill material 34. Similarly, the shells 62, 64 may be formed from in any suitable manner and using any suitable material including those discussed with reference to the shells 36, 38.

The shroud 32 can have any suitable shape depending on the components attached to the seatback 18. For example, as illustrated in FIGS. 5 and 6, the shroud includes an opening 66, two legs 68, and a tray table tab 70. The opening 66 is configured for receiving the personal entertainment device 30. The two legs 68 extend away from a main body portion of the shroud 32 and define a space 72. The space 72 is configured to accommodate the tray table 28. The tray table tab 70 can be used to retain the tray table 28 in an upright position (e.g., stowed position).

The inner shell 62 includes an inner shell lip 74. The inner shell lip 74 extends around at least a portion of the inner shell 62. The outer shell 64 includes an outer shell lip 76. The outer shell lip 76 extends around at least a portion of the outer shell 64. In some examples, as illustrated in FIG. 6, the outer shell lip 76 (or at least a portion thereof) overlaps the inner shell lip 74 (or at least a portion thereof). In some examples, the inner shell lip 74 (or at least a portion thereof) overlaps the outer shell lip 76 (or at least a portion thereof). The lips 74, 76 may together form a connection that holds the shroud 32 together. In some examples, the connection may be a nested connection, an adhesive connection, a bonded connection, or any suitable combination of the foregoing, and/or any other suitable connection. In some examples, the lips 74, 76 include edges that mate or can otherwise form the connection similar to the edges 44, 46 of the bumper device 22. The shroud 32 may also include one or more openings and/or channels for accommodating wiring from the personal entertainment device 30 and other components (e.g., power outlets).

The shroud 32 can include one or more bosses attached to the inner shell 62 and/or the outer shell 64. For example, the bosses may be attached to the outer shell 64 and extend through the fill material 60 and the inner shell 62. In some examples, the shroud fill material 60 and the inner shell 62 can include boss openings through which the bosses attached to the outer shell 64 can be accessed. The bosses may threaded and used to couple the shroud 32 to the seatback 18. When coupled to the seatback 18, the inner shell 62 can be disposed against the seatback 18, with the outer shell 64 facing out. Because of this, the material used for the outer shell 64 may be selected to have certain aesthetic and durability characteristics. In some examples, a first material is used for the outer shell 64 and a second material is used for the inner shell 62.

FIG. 7 illustrates a shell 78 that includes bosses 80a, 80b. The shell 78 is an example of the other shells 34, 36, 62, and 64 described herein. The bosses 80 are examples of other bosses described herein. The bosses 80 are supported by support structures 82a, 82b. The support structures 82 can have any suitable size (e.g., width, height, and length) and cross-section (e.g., square, circular, etc.) in order to support the bosses 80. In some examples, the support structures 82 may extend through boss openings of the composite components described herein. For example, distal ends of the support structures 82 may be about flush with exterior surfaces of the opposing shells. In some examples, the distal ends of the support structures 82 are recessed behind the shells. In this second example, the hardware for connecting to the bosses 80 may be installed through boss openings.

The bosses 80 are threaded bosses. However, other bosses (e.g., outlets), which may not be threaded, may also be used in addition to or instead of the threaded bosses. For example, the support structures 82 may be devoid of the threaded bosses. In this example, self-tapping screws may be installed directly into the support structures 82.

Attachments 84 between the support structures 82 the shell 78 may be formed in any suitable manner. For example, the attachments 84 may be bonded attachments, welded attachments, riveted attachments, and the like.

The components (e.g., shells and fill material) of the composite components described herein may be selected to achieve certain desired characteristics. For example, the thickness of the different shells may be adjusted along with the density and thickness of the fill material to create components having various characteristics of rigidity, weight, energy-dissipation, resilience, and the like.

In the following, further examples are described to facilitate the understanding of the invention: any of the preceding or subsequent examples:

Example 1

In this example, there is provided a seat assembly, comprising: a base frame; a seat spreader bracket coupled to the base frame, and supporting at least a seatback; and a bumper device coupled to the seat spreader bracket and enclosing at least a portion of the seat spread bracket, the bumper device comprising an outer shell and an inner shell, with a foam fill material disposed between the outer shell and the inner shell.

Example 2

In this example, there is provided a seat assembly of any of the preceding or subsequent examples, wherein the outer shell is a first outer shell, the inner shell is a first inner shell, and the fill material is a first fill material, the seat assembly further comprising a shroud coupled to the seatback and covering at least a portion of the seatback, the shroud comprising a second outer shell and a second inner shell, with a second foam fill material disposed between the second outer shell and the second inner shell Example 3

In this example, there is provided a seat assembly of any of the preceding or subsequent examples, the outer shell comprises a cavity bounded along an inner surface of the outer shell; and the inner shell comprises a recessed portion extending into the cavity toward the outer shell, the recessed portion configured to receive the seat spreader bracket and enclose at least the portion of the seat spreader bracket when the bumper is installed on the seat spreader bracket.

Example 4

In this example, there is provided a seat assembly of any of the preceding or subsequent examples, wherein each of the outer shell, the inner shell, the outer shell, and the inner shell is formed using a thermoforming technique.

Example 5

In this example, there is provided a device for use with a seat assembly, the device comprising: an outer shell comprising a cavity bounded along an inner surface of the outer shell; an inner shell comprising a recessed portion extending into the cavity toward the outer shell, the recessed portion configured to receive a component of the seat assembly; and a fill material disposed within at least a portion of the cavity and extending between the outer shell and the inner shell.

Example 6

In this example, there is provided a device of any of the preceding or subsequent examples, wherein the outer shell is formed from a thermoplastic polymer comprising a thickness of between 0.03 inches and 0.1 inches.

Example 7

In this example, there is provided a device of any of the preceding or subsequent examples, further comprising one or more bosses attached to the outer shell, the one or more bosses used to releasably couple the device to the component of the seat assembly.

Example 8

In this example, there is provided a device of any of the preceding or subsequent examples, wherein the fill material comprises at least one of an expanded polystyrene foam or a polyvinylidene fluoride foam.

Example 9

In this example, there is provided a device of any of the preceding or subsequent examples, wherein the fill material has a density of between 15 kilograms per cubic meter and 40 kilograms per cubic meter.

Example 10

In this example, there is provided a device of any of the preceding or subsequent examples, wherein the component comprises a seat spreader bracket, an armrest, or a seatback.

Example 11

In this example, there is provided a device of any of the preceding or subsequent examples, wherein: the outer shell comprises a first perimeter edge, with the cavity bounded by the first perimeter edge; and the inner shell comprises a second perimeter edge, the first perimeter edge and the second perimeter edge forming a connection between the outer shell and the inner shell.

Example 12

In this example, there is provided a device of any of the preceding or subsequent examples, wherein the connection comprises at least one of a nested connection, an adhesive connection, a bonded connection, or combinations thereof.

Example 13

In this example, there is provided a shroud for use with a seat assembly, the shroud comprising: an outer shell comprising; a first cavity bounded along a first inner surface of the outer shell; and a first lip at least extending about a first portion of a first perimeter of the outer shell; an inner shell comprising: a second cavity bounded along a second inner surface of the inner shell; and a second lip at least extending about a second portion of a second perimeter of the inner shell, at least one of the first lip or the second lip configured to at least partially overlap the other; and a fill material disposed within the second cavity and extending between the outer shell and the inner shell.

Example 14

In this example, there is provided a shroud of any of the preceding or subsequent examples, further comprising an opening configured to receive a personal entertainment device.

Example 15

In this example, there is provided a shroud of any of the preceding or subsequent examples, further comprising a first leg, a second leg, and a space disposed between the first leg and the second leg, the space configured to receive a tray table coupled to the seat assembly.

Example 16

In this example, there is provided a shroud of any of the preceding or subsequent examples, wherein the first lip and the second lip form a connection between the outer shell and the inner shell.

Example 17

In this example, there is provided a shroud of any of the preceding or subsequent examples, wherein the outer shell is formed from a thermoplastic polymer comprising a thickness of between 0.03 inches and 0.1 inches.

Example 18

In this example, there is provided a shroud of any of the preceding or subsequent examples, further comprising one or more bosses attached to the outer shell, the one or more bosses used to releasably couple the shroud to the seat assembly.

Example 19

In this example, there is provided a shroud of any of the preceding or subsequent examples, wherein the fill material comprises at least one of an expanded polystyrene foam or a polyvinylidene fluoride foam.

Example 20

In this example, there is provided a shroud of any of the preceding or subsequent examples, wherein the fill material has a density of between 15 kilograms per cubic meter and 40 kilograms per cubic meter.

Example 21

In this example, there is a method comprising providing a composite component comprising an outer shell and an inner shell, with a foam fill material disposed between the outer shell and the inner shell, the composite component configured to couple to a part of a seat assembly; and installing the composite component on the seat assembly such that the composite component detachably couples with the part of the seat assembly.

Spatially relative terms, such as "below", "above", "lower", "upper" and the like may be used above to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A seat assembly, comprising:
   a base frame;
   a seat spreader bracket coupled to the base frame, and supporting at least a seatback; and
   a bumper device comprising (i) an outer shell, (ii) an inner shell, and (iii) a foam fill material disposed between the outer shell and the inner shell, wherein an outer surface of the inner shell is coupled to the seat spreader bracket and encloses at least a portion of the seat spreader bracket.

2. The seat assembly of claim 1, wherein the outer shell is a first outer shell, the inner shell is a first inner shell, and the foam fill material is a first foam fill material, the seat assembly further comprising a shroud coupled to the seatback and covering at least a portion of the seatback, the shroud comprising a second outer shell and a second inner shell, with a second foam fill material disposed between the second outer shell and the second inner shell.

3. The seat assembly of claim 1, wherein:
the outer shell comprises a cavity bounded along an inner surface of the outer shell; and
the inner shell comprises a recessed portion extending into the cavity toward the outer shell, the outer surface of the recessed portion configured to receive the seat spreader bracket and enclose at least the portion of the seat spreader bracket when the bumper device is installed on the seat spreader bracket.

4. The seat assembly of claim 1, wherein each of the outer shell and the inner shell is formed using a thermoforming technique.

5. A device for use with a seat assembly, the device comprising:
an outer shell comprising a cavity bounded along an inner surface of the outer shell;
an inner shell comprising a recessed portion extending into the cavity toward the inner surface of the outer shell, the recessed portion configured to receive a component of the seat assembly; and
a fill material disposed within at least a portion of the cavity and extending between the outer shell and the inner shell.

6. The device of claim 5, wherein the outer shell is formed from a thermoplastic polymer comprising a thickness of between 0.03 inches and 0.1 inches.

7. The device of claim 5, further comprising one or more bosses attached to the outer shell, the one or more bosses used to releasably couple the device to the component of the seat assembly.

8. The device of claim 5, wherein the fill material comprises at least one of an expanded polystyrene foam or a polyvinylidene fluoride foam.

9. The device of claim 5, wherein the fill material has a density of between 15 kilograms per cubic meter and 40 kilograms per cubic meter.

10. The device of claim 5, wherein the component comprises a seat spreader bracket, an armrest, or a seatback.

11. The device of claim 5, wherein:
the outer shell comprises a first perimeter edge, with the cavity bounded by the first perimeter edge; and
the inner shell comprises a second perimeter edge, the first perimeter edge and the second perimeter edge forming a connection between the outer shell and the inner shell.

12. The device of claim 11, wherein the connection comprises at least one of a nested connection, an adhesive connection, a bonded connection, or combinations thereof.

13. A shroud for use with a seat assembly, the shroud comprising:
an outer shell comprising;
a first cavity bounded along a first inner surface of the outer shell; and a first lip at least extending about a first portion of a first perimeter of the outer shell;
an inner shell comprising:
a second cavity bounded along a second inner surface of the inner shell; and
a second lip at least extending about a second portion of a second perimeter of the inner shell, at least one of the first lip or the second lip configured to at least partially overlap the other; and
a fill material disposed within the second cavity and extending between the outer shell and the inner shell.

14. The shroud of claim 13, further comprising an opening configured to receive a personal entertainment device.

15. The shroud of claim 13, further comprising a first leg, a second leg, and a space disposed between the first leg and the second leg, the space configured to receive a tray table coupled to the seat assembly.

16. The shroud of claim 13, wherein the first lip and the second lip form a connection between the outer shell and the inner shell.

17. The shroud of claim 13, wherein the outer shell is formed from a thermoplastic polymer comprising a thickness of between 0.03 inches and 0.1 inches.

18. The shroud of claim 13, further comprising one or more bosses attached to the outer shell, the one or more bosses used to releasably couple the shroud to the seat assembly.

19. The shroud of claim 13, wherein the fill material comprises at least one of an expanded polystyrene foam or a polyvinylidene fluoride foam.

20. The shroud of claim 13, wherein the fill material has a density of between 15 kilograms per cubic meter and 40 kilograms per cubic meter.

21. The shroud of claim 13, wherein the inner shell has a predefined rigid shape, and comprises an outer surface that is configured for mounting to a seatback.

22. The shroud of claim 13, wherein the fill material occupies substantially all of the second cavity and extends between the first inner surface of the outer shell and the second inner surface of the inner shell.

23. A method, comprising
providing a composite component comprising an outer shell and an inner shell, with a foam fill material disposed between the outer shell and the inner shell, the composite component configured to couple to a part of a seat assembly, wherein the inner shell comprises an outer surface; and
installing the composite component on the seat assembly such that (i) the composite component detachably couples with the part of the seat assembly, and (ii) the outer surface of the inner shell encloses at least a portion of the part of the seat assembly.

* * * * *